(12) United States Patent
Takami et al.

(10) Patent No.: US 9,882,213 B2
(45) Date of Patent: Jan. 30, 2018

(54) NONAQUEOUS ELECTROLYTE BATTERY

(75) Inventors: Norio Takami, Yokohama (JP); Hiroki Inagaki, Kawasaki (JP); Shinsuke Matsuno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 462 days.

(21) Appl. No.: 12/729,412

(22) Filed: Mar. 23, 2010

(65) Prior Publication Data
US 2010/0248038 A1    Sep. 30, 2010

(30) Foreign Application Priority Data

Mar. 25, 2009 (JP) ................................. 2009-073121

(51) Int. Cl.
*H01M 4/505* (2010.01)
*H01M 4/36* (2006.01)
(Continued)

(52) U.S. Cl.
CPC ........... *H01M 4/505* (2013.01); *H01M 4/364* (2013.01); *H01M 4/485* (2013.01); *H01M 4/5825* (2013.01); *H01M 10/0525* (2013.01); *H01M 10/0569* (2013.01); *H01M 2300/0037* (2013.01); *Y02T 10/7011* (2013.01)

(58) Field of Classification Search
CPC ......... H01M 10/0525; H01M 10/0569; H01M 2300/0037; H01M 4/364; H01M 4/485; H01M 4/505; H01M 4/5825; Y02E 60/122; Y02T 10/7011
USPC ...... 429/209, 218.1, 221, 224, 231.1, 231.3, 429/231.9, 231.95, 188, 324, 236, 327
See application file for complete search history.

(56) References Cited

U.S. PATENT DOCUMENTS

2004/0096743 A1\* 5/2004 Okae ..................... H01M 4/131
429/231.1
2004/0157126 A1\* 8/2004 Belharouak et al. ...... 429/231.8
(Continued)

FOREIGN PATENT DOCUMENTS

JP      10-208730       8/1998
JP     2001-143702      5/2001
(Continued)

OTHER PUBLICATIONS

Office Action issued Sep. 13, 2011 in Japanese Patent Application No. 2009-073121 (with English translation).
(Continued)

*Primary Examiner* — Basia Ridley
*Assistant Examiner* — Heng Chan
(74) *Attorney, Agent, or Firm* — Oblon, McClelland, Maier & Neustadt, L.L.P.

(57) ABSTRACT

A nonaqueous electrolyte battery includes a positive electrode, a negative electrode and a nonaqueous electrolyte. The positive electrode includes a lithium/manganese-containing oxide represented by $Li_aMn_bM_cO_Z$ (M is at least one selected from the group consisting of Ni, Co, Al and F, and a, b, c and Z satisfy the following equations: $0 \leq a \leq 2.5$, $0 < b \leq 1$, $0 \leq c \leq 1$ and $2 \leq Z \leq 3$) and a Fe-containing phosphorous compound having an olivine structure. The negative electrode includes a titanium-containing metal oxide into which lithium ions are inserted and from which lithium ions are extracted.

16 Claims, 2 Drawing Sheets

(51) Int. Cl.
*H01M 4/485* (2010.01)
*H01M 4/58* (2010.01)
*H01M 10/0525* (2010.01)
*H01M 10/0569* (2010.01)

(56) References Cited

U.S. PATENT DOCUMENTS

| | | | |
|---|---|---|---|
| 2006/0068272 A1* | 3/2006 | Takami et al. | 429/62 |
| 2006/0199080 A1 | 9/2006 | Amine et al. | |
| 2006/0216601 A1* | 9/2006 | Komiyama et al. | 429/231.1 |
| 2006/0292450 A1* | 12/2006 | Nakanishi et al. | 429/326 |
| 2008/0268342 A1* | 10/2008 | Suzuki | C01B 25/45 429/231.5 |
| 2009/0081534 A1* | 3/2009 | Takami | H01M 2/1626 429/149 |
| 2010/0028773 A1* | 2/2010 | Hirota et al. | 429/203 |

FOREIGN PATENT DOCUMENTS

| | | |
|---|---|---|
| JP | 2002-42889 | 2/2002 |
| JP | 2002-216755 | 8/2002 |
| JP | 2004-87299 | 3/2004 |
| JP | 2006-40748 A | 2/2006 |
| JP | 2006-252894 | 9/2006 |
| JP | 2006-523368 | 10/2006 |
| JP | 2007-80738 A | 3/2007 |
| JP | 2007-207490 A | 8/2007 |
| JP | 2007-250299 | 9/2007 |
| JP | 2007-250433 A | 9/2007 |
| JP | 2007-317538 A | 12/2007 |
| JP | 2008-532248 A | 8/2008 |
| JP | 2008-536271 A | 9/2008 |
| JP | 2008-277152 | 11/2008 |
| JP | 2009-245808 A | 10/2009 |
| JP | 2011-159388 A | 8/2011 |
| WO | WO 2008108360 A1 * | 9/2008 |

OTHER PUBLICATIONS

Japanese Office Action Issued Aug. 7, 2012 in Patent Application No. 2009-073121 (with English translation).

Office Action issued Dec. 9, 2014 in Japanese Patent Application No. 2013-210497 (with English translation).

Office Action dated Jun. 4, 2013, in Japanese Patent Application No. 2011-248406.

* cited by examiner

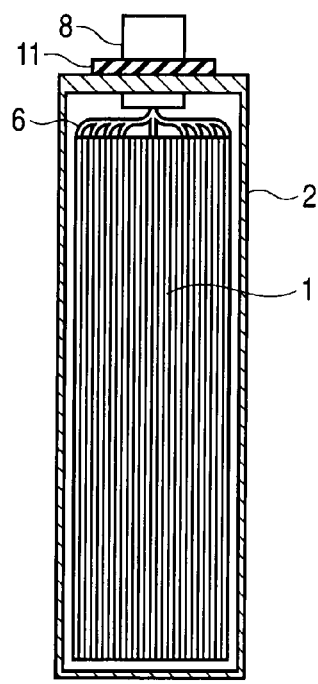
F I G. 2
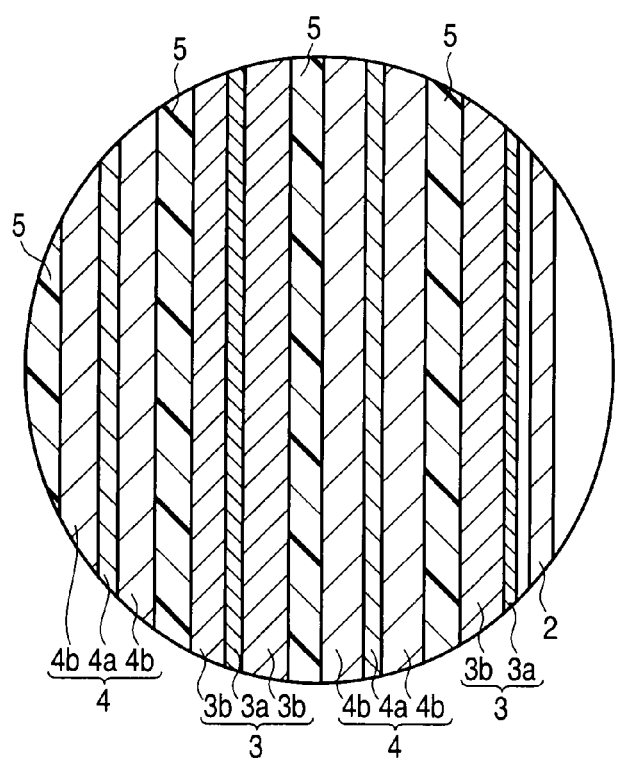
F I G. 3

NONAQUEOUS ELECTROLYTE BATTERY

CROSS-REFERENCE TO RELATED APPLICATIONS

This application is based upon and claims the benefit of priority from prior Japanese Patent Application No. 2009-073121, filed Mar. 25, 2009, the entire contents of which are incorporated herein by reference.

BACKGROUND OF THE INVENTION

1. Field of the Invention

The present invention relates to a nonaqueous electrolyte battery.

2. Description of the Related Art

Nonaqueous electrolyte batteries using a lithium metal, lithium alloy, lithium compound or carbonaceous materials as the negative electrode active material are expected as high energy density batteries and earnest studies are being made as to these nonaqueous electrolyte batteries. Lithium ion batteries comprising a positive electrode containing $LiCoO_2$ or $LiMn_2O_4$ as an active material and a negative electrode containing a carbonaceous material that absorbs and release lithium ions have been widely put to practical use in portable telephones so far.

In the case of mounting a battery in vehicles or electric trains, on the other hand, materials superior in chemical or electrochemical stability, strength and corrosion resistance are desired as the materials of the positive electrode or negative electrode from the viewpoint of storage performance at a high temperature (60° C. or more), cycle performance and long term reliability of high output.

Therefore, it is found from the above descriptions that lithium ion batteries pose a large problem concerning high-temperature durability necessary to mount them on a car and the like. Particularly, it is difficult to use these lithium ion batteries by mounting them on the engine room of vehicles in place of lead batteries.

Various attempts have been made to improve negative electrode characteristics. JP-A 2002-42889 (KOKAI) discloses that a negative electrode having a structure in which a current collector made from aluminum or an aluminum alloy is made to carry a specified metal, alloy or compound is used in a nonaqueous electrolyte secondary battery.

On the other hand, JP-A 2001-143702 (KOKAI) discloses that primary particles of lithium titanate compound represented by the formula $Li_aTi_{3-a}O_4$ (0<a<3) and having an average particle diameter less than 1 µm are coagulated into granules having an average particle diameter of 5 to 100 µm to form secondary particles, which are used as a negative electrode active material. Also, in JP-A 2001-143702 (KOKAI), there is the description that the coagulation of secondary particles is suppressed by the use of this negative electrode active material, which increases the production yield of a negative electrode having a large area for a large scale battery.

Also, studies are being made as to the development of a higher capacity positive electrode material to develop a battery having a high energy density. As the positive electrode materials substituted for lithium cobalt oxides such as $LiCoO_2$, for example, lithium/nickel/cobalt oxides such as $LiNi_xCo_{1-x}O_2$ and lithium/manganese oxides such as $LiMnO_2$ are being developed for practical use. However, these materials have problems concerning cycle life performance and thermal stability under high temperatures.

BRIEF SUMMARY OF THE INVENTION

According to one aspect of the present invention, there is provided a nonaqueous electrolyte battery comprising:

a positive electrode comprising a lithium/manganese-containing oxide represented by $Li_aMn_bM_cO_Z$ (M is at least one selected from the group consisting of Ni, Co, Al and F, and a, b, c and Z satisfy the following equations: $0 \leq a \leq 2.5$, $0 < b \leq 1$, $0 \leq c \leq 1$ and $2 \leq Z \leq 3$) and a Fe-containing phosphorous compound having an olivine structure;

a negative electrode comprising a titanium-containing metal oxide into which lithium ions are inserted and from which lithium ions are extracted; and a nonaqueous electrolyte.

BRIEF DESCRIPTION OF THE SEVERAL VIEWS OF THE DRAWING

FIG. 2 is a sectional view along the line A-A in the secondary battery of FIG. 1; and FIG. 3 is an enlarged sectional view of an essential part of the secondary battery of FIG. 2.

DETAILED DESCRIPTION OF THE INVENTION

Figure 1:
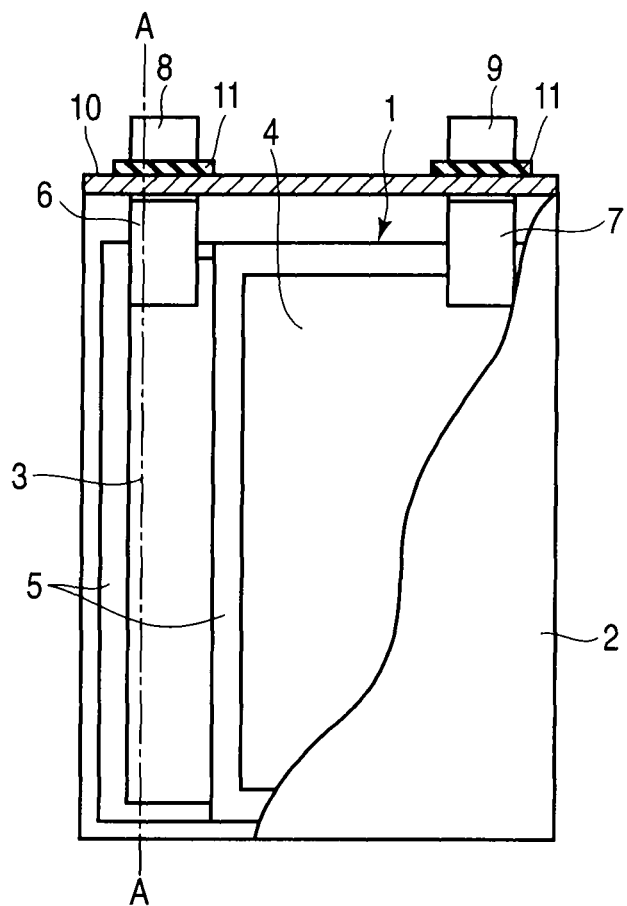
FIG. 1 is a partially broken sectional view showing an angular type nonaqueous electrolyte secondary battery according to an embodiment.

Positive electrode active materials made of lithium/manganese-containing oxides represented by $Li_aMn_bM_cO_Z$ (M is at least one selected from the group consisting of Ni, Co, Al and F, and a, b, c and Z satisfy the following equations: $0 \leq a \leq 2.5$, $0 < b \leq 1$, $0 \leq c \leq 1$ and $2 \leq Z \leq 3$) have the advantage that they each have a higher weight energy density than $LiNiO_2$, $LiCoO_2$ and spinnel type lithium/manganese oxides such as $LiMn_2O_4$. However, if a negative electrode containing a titanium-containing metal oxide into which lithium ions are inserted and from which lithium ions are extracted is combined with this positive electrode active material, no protective film is produced on the surface of the negative electrode. As a result, the self-discharge of the negative electrode progresses and the charge/discharge efficiency of the negative electrode is deteriorated.

Also, because in the last stage of discharge, the negative electrode potential of the titanium-containing metal oxide is slowly raised whereas the positive electrode potential of the lithium/manganese-containing oxide is sharply dropped, and therefore, a battery voltage curve in the last stage of discharge is limited by a variation in positive electrode potential. Even if the discharge is cut off when the positive electrode potential is sharply dropped, the positive electrode is already put into an overdischarge state at this time, causing a progress in the deterioration of the positive electrode.

When a Fe-containing phosphorous compound having an olivine structure is added to a lithium/manganese-containing oxide having the above composition, the iron component of the Fe-containing phosphorous compound is deposited on the surface of the negative electrode containing the titanium-containing metal oxide to form a protective film on the surface of the negative electrode. Because the self-discharge of the negative electrode is thereby limited, the charge/discharge efficiency of the negative electrode can be improved. Also, the positive electrode potential drops in stages in the last discharge state. Therefore, the rise in negative electrode potential makes it possible to reach the cutoff voltage of the discharge and therefore, overdischarge of the positive electrode can be prevented.

From these results, the battery can be improved in storage performance and charge/discharge cycle performance in a circumstance at a temperature as high as 60° C. or more while keeping the feature of a high weight energy density which is the characteristics of a lithium/manganese-containing oxide. This makes it possible to attain a nonaqueous electrolyte battery which has a high capacity and is superior in storage performance and cycle performance even if it is used in a circumstance, for example, a car engine room at a temperature as high as 60° C. or more.

Therefore, according to this embodiment, a nonaqueous electrolyte battery can be provided which has a high capacity and is superior in storage performance and cycle performance even in a high-temperature circumstance.

The positive electrode, negative electrode, nonaqueous electrolyte and separator contained in the nonaqueous electrolyte battery of this embodiment will be explained.

1) Positive Electrode

The positive electrode comprises a positive electrode current collector and a positive electrode layer which is carried on one or both surfaces of the positive electrode current collector and contains a positive electrode active material, a conductive agent and a binder.

The positive electrode active material contains a first positive electrode active material containing a lithium/manganese-containing oxide represented by $Li_aMn_bM_cO_Z$ (M is at least one selected from the group consisting of Ni, Co, Al and F, and a, b, c and Z satisfy the following equations: $0 \le a \le 2.5$, $0 < b \le 1$, $0 \le c \le 1$ and $2 \le Z \le 3$) and a second positive electrode active material containing a Fe-containing phosphorous compound having an olivine structure.

First, the composition of the first positive electrode active material will be explained.

The molar ratio a of Li may be changed in the following range: $0 \le a \le 2.5$ depending on the charge/discharge reaction.

When the molar ratio b of Mn exceeds 1, the capacity of the battery is dropped. b is more preferably in the following range: $0.1 \le b \le 0.8$.

Among the elements represented by M, Co and Al each have the effect of improving the crystallinity of lithium/manganese-containing oxides. Also, F has the effect of suppressing the decomposition of a nonaqueous electrolyte. When the molar ratio c of M exceeds 1, the capacity is dropped. c is preferably in the following range: $0.1 \le c \le 0.8$.

When the molar ratio Z is less than 2 or exceeds 3, the capacity is dropped. Z is more preferably in the following range: $2.2 \le Z \le 2.9$.

Preferable examples of the lithium/manganese-containing oxide having the above composition include $LiMn_{1-x-y}Ni_xCo_yO_2$ ($0 \le x < 1$, $0 \le y < 1$), $LiMn_{1-x}Ni_xO_2$ ($0 \le x < 1$), $Li_2MnO_3$ and $Li_2MnO_3$—$LiTO_2$ solid solution, and T is at least one element selected from the group consisting of Mn, Ni and Co. A high weight energy density of 200 mAh/g or more can be thereby attained.

The second positive electrode active material will be explained.

The Fe-containing phosphorous compound having an olivine structure preferably has a composition containing Mn. The positive electrode potential can be thereby improved. Also, the Fe-containing phosphorous compound is allowed to contain metal elements other than Mn and Fe, for example, Co or Ni.

The Fe-containing phosphorous compound having an olivine structure is preferably represented by $Li_dMn_xFe_{1-x}PO_4$, and d may be changed in the following range: $0 \le d \le 2.5$ depending on the charge/discharge reaction and x satisfies the following equation: $0 \le x < 1$. This can improve the effect of suppressing the overdischarge reaction of the positive electrode and self-discharge reaction of the negative electrode. The molar ratio x of Mn is preferably in the following range: $0 < x \le 0.8$. When the molar ratio x of Mn is in the above range, the self-discharge at high temperatures is further suppressed. Also, the capacity of the battery can be increased.

Because the Fe-containing phosphorous compound having an olivine structure has insulation property, the surfaces of particles of the Fe-containing phosphorous compound are preferably coated with a conductive material such as carbon. Examples of the carbon material include carbonaceous materials in which the layer spacing $d_{002}$ of the (002) plane detected by X-ray diffraction is 0.37 nm or less.

As to the coating method, particles of the Fe-containing phosphorous compound having an olivine structure are dispersed in a solution containing a C component, and the particles is dried and then, baked at 400 to 800° C. in a reducing atmosphere, with the result that the surfaces of the particles are coated with a conductive material to obtain a second positive electrode active material.

When the weight of the first positive electrode active material is set to 100% by weight, the weight of the second positive electrode active material is preferably designed to be in the range of 1% by weight to 80% by weight. When the weight of the second positive electrode active material is in this range, the cycle life performance is outstandingly improved. The weight of the second positive electrode active material is more preferably in the range of 2% by weight to 60% by weight and even more preferably in the range of 10% by weight to 60% by weight.

Examples of the conductive agent include acetylene black, carbon black, graphite and carbon fibers. Particularly, carbon fibers formed by a vapor phase growth method and having a fiber diameter of 1 μm or less are preferable. The use of this carbon fibers ensures that an electronic conductive network inside of the positive electrode is improved, thereby the output performance of the positive electrode can be improved.

Examples of the binder include a polytetrafluoroethylene (PTFE), polyvinylidene fluoride (PVdF) and fluoro rubber.

As to the ratio of the active material, conductive agent and binder of the positive electrode to be compounded, it is preferable that the positive electrode active material be 80 to 95% by weight, the conductive agent be 3 to 19% by weight and the binder be 1 to 7% by weight.

As the current collector, an aluminum foil or aluminum alloy foil is preferable and the thickness of the current collector is preferably 20 μm or less and more preferably 15 μm or less.

The positive electrode is manufactured, for example, by suspending the positive electrode active material, conductive agent and binder in a proper solvent and this suspension is applied to one or both surfaces of the current collector, followed by drying and pressing. The specific surface area of the positive electrode layer using the BET method is measured in the same manner as in the case of the negative electrode and is preferably in the range of 0.1 to 2 m²/g.

2) Negative Electrode

The negative electrode comprises a negative electrode current collector and a negative electrode layer which is carried on one or both surfaces of the negative electrode current collector and contains a negative electrode active material, a conductive agent and a binder.

The negative electrode active material is a titanium-containing metal oxide into which lithium ions are inserted and from which lithium ions are extracted. Examples of the titanium-containing metal oxide may include titanium-based oxides and lithium/titanium-containing composite oxides such as lithium/titanium oxides.

Examples of the lithium/titanium-containing composite oxide include lithium/titanium oxides having a spinel structure, lithium/titanium oxides having a rhamsdelite structure, $Li_{1+x}Ti_2O_4$ (x may be varied in the following range: $0 \leq x \leq 1$), $Li_{1.1+x}Ti_{1.8}O_4$ (x may be varied in the following range: $0 \leq x \leq 1$) and $Li_{1.07+x}Ti_{1.86}O_4$ (x may be varied in the following range: $0 \leq x \leq 1$). Examples of the lithium/titanium oxides having a spinel structure include $Li_{4+x}Ti_5O_{12}$, and x may be varied in the following range: $-1 \leq x \leq 3$, depending on the charge/discharge reaction. Examples of the lithium/titanium oxides having a rhamsdelite structure include $Li_{2+x}Ti_3O_7$, and x may be varied in the following range: $-1 \leq x \leq 3$, depending on the charge/discharge reaction.

Examples of the titanium-based oxide include $Li_xTiO_2$ ($0 \leq x$), $TiO_2$ and titanium-containing metal composite oxides containing Ti and at least one element selected from the group consisting of P, V, Sn, Cu, Ni and Fe. Examples of the titanium-containing metal composite oxides include $TiO_2$—$P_2O_5$, $TiO_2$—$V_2O_5$, $TiO_2$—$P_2O_5$—$SnO_2$, $TiO_2$—$P_2O_5$-MeO, and Me is at least one element selected from the group consisting of Cu, Ni, and Fe. It is preferable that the titanium-containing metal composite oxide have less crystallinity and a microstructure in which a crystal phase and an amorphous phase coexist or an amorphous phase singly exists. Such a microstructure can remarkably improve the cycle performance. As $TiO_2$, anatase type titanium dioxides, monoclinic system titanium dioxide (usually so-called $TiO_2$(B)) and less crystalline titanium dioxide which is heat-treated at 300 to 600° C. are preferable.

Particularly, $Li_{4+x}Ti_5O_{12}$ having a spinel structure, $Li_{2+x}Ti_3O_7$ having a rhamsdelite structure, anatase type titanium dioxide and $TiO_2$(B) are preferable. It is advantageous to use $TiO_2$(B) to attain a high-capacity battery and $Li_{4+x}Ti_5O_{12}$ having a spinel structure to attain a long-life battery.

Primary particles of the negative electrode active material are preferably designed to have an average particle diameter of 0.001 to 1 μm. When the average particle diameter is designed to be 0.001 μm or more, the distribution of the nonaqueous electrolyte can be uniformed, to thereby suppress the depletion of the nonaqueous electrolyte at the positive electrode. If the average particle diameter is designed to be 1 μm or less, a reduction in the porosity of the negative electrode when the specific surface area of the negative electrode is designed to be 3 to 50 $m^2/g$ can be suppressed. Also, as to particle shape, any of granular and fibrous forms may be used to obtain good performances. In the case of the fibrous form, the diameter of the fibers is preferably 0.1 μm or less.

The average particle diameter of the negative electrode active material is preferably 1 μm or less and the specific surface area of the negative electrode active material is in the range of 3 to 200 $m^2/g$ when measured by the BET method using $N_2$ adsorption. This structure allows the negative electrode to have stronger affinity to the nonaqueous electrolyte.

The specific surface area of the negative electrode is preferably designed to be in the range of 3 to 50 $m^2/g$. This makes it possible to more improve the output performance and charge/discharge cycle performance of the nonaqueous electrolyte battery. The specific surface area is more preferably 5 to 50 $m^2/g$. Here, the specific surface area of the negative electrode means the surface area per 1 g of the negative electrode layer. The weight of the negative electrode layer is obtained by subtracting the weight of the current collector from the weight of the negative electrode. The negative electrode layer is a porous layer carried on the current collector and containing a negative electrode active material, a conductive agent and a binder.

The porosity of the negative electrode (excluding the current collector) is preferably designed to be in the range of 20 to 50%. This enables the production of a negative electrode which has high affinity to the nonaqueous electrolyte and has a high density. The porosity is more preferably in the range of 25 to 40%.

The negative electrode current collector is preferably made of an aluminum foil or an aluminum alloy foil. The thickness of the negative electrode current collector is preferably 20 μm or less and more preferably 15 μm or less. The purity of the aluminum foil is preferably 99.99 wt % or more. As the aluminum alloy, alloys containing elements such as magnesium, zinc and silicon are preferable. On the other hand, the amount of transition metals such as iron, copper, nickel and chromium is preferably designed to be 100 ppm by weight or less.

Examples of the conductive agent may include acetylene black, carbon black, cokes, carbon fibers, graphite, metal compound powder and metal powder. More preferable examples of the conductive agent include cokes which are heat-treated at 800 to 2000° C. and have an average particle diameter of 10 μm or less, graphite, TiO, TiC, TiN and metal powders such as Al, Ni, Cu and Fe.

Examples of the binder include a polytetrafluoroethylene (PTFE), polyvinylidene fluoride (PVdF), fluoro rubber, styrene-butadiene rubber and core-shell binder.

As to the ratio of the active material, conductive agent and binder of the negative electrode, it is preferable that the negative electrode active material is 80 to 95% by weight, the conductive agent is 1 to 18% by weight and the binder is 2 to 7% by weight.

The negative electrode is manufactured, for example, by suspending the negative electrode active material, conductive agent and binder in an adequate solvent and by applying the obtained suspension to the current collector, followed by drying and pressing under heating.

3) Separator

A separator may be disposed between the positive electrode and the negative electrode. As the material of the separator, for example, nonwoven fabrics made of synthetic resins, nonwoven fabrics made of celluloses, polyethylene porous films or polypropylene porous films may be used.

The porosity of the separator is preferably 50% or more. Also, the separator preferably has a thickness of 10 to 100 μm and a density of 0.2 to 0.9 $g/cm^3$. When these items are in the above ranges, the balance between mechanical strength and a reduction in battery resistance can be kept and therefore, a nonaqueous electrolyte battery which has high output and is reduced in the development of internal short circuits can be provided.

The positive electrode and negative electrode with a separator interposed therebetween are, for example, spirally coiled and laminated to obtain an electrode group. In this electrode group, the positive electrode layer preferably has a larger area than the negative electrode layer facing it through the separator. This ensures that the potential of the edge part of the positive electrode layer can be made equal to the potential of the center part of the positive electrode layer facing the negative electrode layer through the separator, so that overdischarge at the edge part of the positive electrode layer is suppressed and the reaction between the positive electrode layer and the nonaqueous electrolyte is suppressed. This can improve charge/discharge cycle life performance at high temperatures.

The ratio (Sp/Sn) of the area (Sp) of the positive electrode layer to the area (Sn) of the negative electrode layer is preferably in the range of 0.85 to 0.999. When the area ratio (Sp/Sn) is 0.85 or more, the battery capacity is improved. Also, when the area ratio (Sp/Sn) is 0.999 or less, the generation of gas at high-temperature charge storage and high-temperature float charge can be suppressed. The area ratio (Sp/Sn) is more preferably in the range of 0.95 to 0.99. Also, the ratio (Lp/Ln) of the width (Lp) of the positive electrode to the width (Ln) of the negative electrode is preferably in the range of 0.9 to 0.99.

4) Nonaqueous Electrolyte

Examples of the nonaqueous electrolyte include liquid organic electrolytes prepared by dissolving an electrolyte in an organic solvent, gel organic electrolytes obtained by making a complex of an organic solvent and a polymer material, and solid nonaqueous electrolytes obtained by making a complex of a lithium salt electrolyte and a polymer material. Also, room temperature molten salts containing lithium ions or an ionic liquid containing lithium ions may be used as the nonaqueous electrolyte. Examples of the polymer material may include a polyvinylidene fluoride (PVdF), polyacrylonitrile (PAN) and polyethylene oxide (PEO).

The liquid organic electrolyte is prepared by dissolving an electrolyte in an organic solvent in a concentration of 0.5 to 2.5 mol/L.

Examples of the electrolyte include $LiBF_4$, $LiPF_6$, $LiAsF_6$, $LiClO_4$, $LiCF_3SO_3$, $LiN(CF_3SO_2)_2$, $LiN(C_2F_5SO_2)_2$, $Li(CF_3SO_2)_3C$, $LiBF_2C_2O_4$, $LiB[(OCO)_2]_2$. One or two or more types of electrolytes may be used. The electrolyte preferably contains lithium tetrafluoroborate ($LiBF_4$). This ensures that the chemical stability of the organic solvent can be improved and the film resistance on the negative electrode can be reduced, bringing about a significant improvement in low-temperature performance and cycle life performance.

Examples of the organic solvent may include cyclic carbonates such as propylene carbonate (PC) and ethylene carbonate (EC), chain carbonates such as diethyl carbonate (DEC) and dimethyl carbonate (DMC) and methyl ethyl carbonate (MEC), chain ethers such as dimethoxyethane (DME) and diethoxyethane (DEE), cyclic ethers such as tetrahydrofuran (THF) and dioxolan (DOX), γ-butyrolactone (GBL), acetonitrile (AN) and sulfolane (SL). These organic solvents may be used either singly or in combinations of two or more. Particularly, a nonaqueous solvent containing a first solvent containing at least one selected from the group consisting of propylene carbonate (PC), ethylene carbonate (EC) and γ-butyrolactone (GBL), and a second solvent containing at least one selected from the group consisting of diethyl carbonate (DEC), methyl ethyl carbonate (MEC) and dimethyl carbonate (DMC) is highly stable at a potential as high as 4.4 to 4.5 V and can therefore improve cycle life performance. The ratio of the second solvent is preferably 70 vol % or more. The nonaqueous solvent containing EC and DEC has high stability at a potential as high as 4.4 to 4.5 V and can therefore suppress the oxidation decomposition of the nonaqueous electrolyte.

The nonaqueous electrolyte containing an ionic liquid will be explained.

The ionic liquid is preferably contains lithium ion, an organic cation and an organic anion. Also, the ionic liquid preferably has a liquid state at ambient temperature or less.

The ionic liquid means a salt in which at least a part thereof exhibits a liquid state at normal temperature. Here, the normal temperature means a temperature range in which a power source works in usual. The temperature range in which a power source usually works means that the upper limit of the temperature is about 120° C. (about 60° C. depending on the case) and the lower limit is about −40° C. (−20° C. depending on the case). Particularly, the temperature range of −20 to 60° C. is appropriate.

As the ionic liquid containing lithium ions, an ionic liquid containing lithium ions, an organic cation and an anion is preferably used. Also, this ionic liquid is preferably in a liquid state at the ambient temperature or lower.

Examples of the above organic cation include alkylimidazolium ions and quaternary ammonium ions having a skeleton represented by the following formula (1).

[Formula 1]

Chemical formula (1)

As the above alkylimidazolium ion, a dialkylimidazolium ion, a trialkylimidazolium ion and a tetraalkylimidazolium ion and the like are preferable. As the dialkylimidazolium ion, 1-methyl-3-ethylimidazolium ion ($MEI^+$) is preferable. As the trialkylimidazolium ion, 1,2-diethyl-3-propylimidazolium ion ($DMPI^+$) is preferable. As the tetraalkylimidazolium ion, 1,2-diethyl-3,4(5)-dimethylimidazolium ion is preferable.

As the above quaternary ammonium ion, a tetraalkylammonium ion, a cyclic ammonium ion and the like are preferable. As the tetraalkylammonium ion, dimethylethylmethoxyethylammonium ion, dimethylethylmethoxymethylammonium ion, dimethylethylethoxyethylammonium ion and trimethylpropylammonium ion are preferable.

When the above alkylimidazolium ion or a quaternary ammonium ion (especially, a tetraalkylammonium ion) is used, the melting point is preferably 100° C. or less and more preferably 20° C. or less. Also, the reactivity with the negative electrode can be reduced.

The concentration of the lithium ion is preferably 20 mol % or less. The concentration is more preferably in the range of 1 mol % to 10 mol %. When the concentration is made to be in the above range, an ionic liquid can stability exist at a low temperature such as 20° C. or less. Also, the viscosity can be lowered at temperatures equal to or lower than normal temperature and the ion conductivity can be heightened.

The anion preferably is at least one selected from the group of, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $(FSO_2)_2N^-$, $N(CF_3SO_2)_2^-$, $N(C_2F_5SO_2)_2^-$ and $(CF_3SO_2)_3C^-$. The coexistence with plural anions makes it possible to form an ionic liquid having a melting point of 20° C. or less. More preferable examples of the anion include $BF_4^-$, $(FSO_2)_2N^-$, $CF_3SO_3^-$, $CF_3COO^-$, $CH_3COO^-$, $CO_3^{2-}$, $N(CF_3SO_2)_2^-$, $N(C_2F_5SO_2)_2^-$ and $(CF_3SO_2)_3C^-$. An ionic liquid having a melting point of 0° C. or less is formed more easily by these anions.

5) Container

As the container that receives the positive electrode, negative electrode and nonaqueous electrolyte, a metal container or a laminate film container may be used.

As the metal container, a metallic can which is made of aluminum, an aluminum alloy, iron or stainless and has a rectangular or cylindrical shape may be used. The plate thickness of the container is preferably 0.5 mm or less and more preferably 0.3 mm or less.

Examples of the laminate film may include a multilayer film obtained by coating an aluminum foil with a resin film. As the resin, polymers such as a polypropylene (PP), polyethylene (PE), nylon, polyethylene terephthalate (PET) may be used. Also, the thickness of the laminate film is preferably 0.2 mm or less and also, the purity of the aluminum foil is preferably 99.5% by weight or more.

The metallic can made of an aluminum alloy is preferably formed of an alloy containing an element such as manganese, magnesium, zinc and silicon and having an aluminum purity of 99.8% by weight or less. An outstanding increase in the strength of the metallic can made of an aluminum alloy offers possibility of a reduction in the wall thickness of the can. As a result, a thin, light-weight and high-output battery superior in heat radiation ability can be attained.

The embodiments may be applied to nonaqueous electrolyte batteries having various forms such as a cylinder form, thin plate form, angular form and coin form. An embodiment of a nonaqueous electrolyte battery is shown in FIGS. 1 to 3. As shown in FIG. 1, an electrode group 1 is received in a metal container 2 having a rectangular and cylinder form. The electrode group 1 has a structure in which a positive electrode 3 and a negative electrode 4 with a separator 5 interposed therebetween are spirally coiled so as to have a flat shape. The positive electrode 3 contains a positive electrode current collector 3a and a positive electrode layer 3b carried on the positive electrode current collector 3a. The negative electrode 4 contains a negative electrode current collector 4a and a negative electrode layer 4b carried on the negative electrode current collector 4a. The electrode group 1 is manufactured, for example, by spirally coiling the positive electrode 3 and negative electrode 4 with the separator 5 interposed therebetween so as to have a flat form, followed by pressing under heating.

As shown in FIG. 3, the positive electrode 3 has a structure in which the positive electrode layer 3b is formed on one or both surfaces of the positive electrode current collector 3a. On the other hand, the negative electrode 4 has a structure in which the negative electrode layer 4b is formed on one or both surfaces of the negative electrode current collector 4a. A nonaqueous electrolyte (not shown) is hold by the electrode group 1. As shown in FIG. 2, plural band-like positive electrode leads 6 are drawn from the end surface of the electrode group 1. The positive electrode leads 6 are electrically connected with the end of the positive electrode 3 as shown in FIG. 1. Negative electrode leads 7 are electrically connected with the end of the negative electrode 4 as shown in FIG. 1. Though not shown here, plural negative electrode leads 7 are also drawn from the same end surface of the electrode group 1. The plural positive electrode leads 6 are bundled and electrically connected with a positive electrode conductive tab 8. A positive electrode terminal includes the positive electrode lead 6 and the positive electrode conductive tab 8. Also, the negative electrode leads 7 are bundled and electrically connected with a negative electrode conductive tab 9. A negative electrode terminal includes the negative electrode lead 7 and the negative electrode conductive tab 9. A metal seal plate 10 is secured to an opening part of the metal container 2 by welding or the like. The positive electrode conductive tab 8 and the negative electrode conductive tab 9 are each drawn out of a takeout hole formed in the seal plate 10. The inside peripheral surface of each takeout hole of the seal plate 10 is coated with an insulation member 11 to avoid the development of short circuits caused by the contact of the inside peripheral surface with the positive electrode conductive tab 8 and with the negative electrode conductive tab 9.

EXAMPLES

The embodiment of the present invention will be explained in more detail by way of examples with reference to the drawings. However, these examples are not intended to limit the present invention.

Example 1

Lithium/manganese/nickel oxide ($LiMn_{0.2}Ni_{0.8}O_2$) particles were prepared as a first positive electrode active material. Also, a second positive electrode active material was prepared. The second positive electrode active material was lithium/iron phosphate ($LiFePO_4$) particles having an average primary particle diameter of 0.1 μm and an olivine structure, and provided with carbon microparticles which had an average particle diameter of 0.005 μm and stuck to the surface thereof with an amount to be stuck of 0.1% by weight. 10% by weight of the second positive electrode active material was added to 80% by weight of the first positive electrode active material, to which were then added 5% by weight of a graphite powder as a conductive agent and 5% by weight of PVdF based on the positive electrode as a binder. These components were dispersed in n-methylpyrrolidone (NMP) solvent to prepare a slurry. The slurry was applied to each surface of an aluminum alloy foil (purity: 99% by weight) 15 μm in thickness, followed by drying and pressing to obtain a positive electrode which was provided with a positive electrode layer 43 μm in thickness on each surface thereof and had an electrode density of 2.2 g/cm$^3$. The specific surface area of the positive electrode layer was 5 m$^2$/g. The ratio of the second positive electrode active material to be added was 12.5% by weight based on 100% by weight of the first positive electrode active material.

A $TiO_2$ (B) powder having an average primary particle diameter of 1 μm, a BET specific surface area of 20 m$^2$/g and a Li-inserting potential of about 1.5 V (vs. Li/Li$^+$), a graphite powder having an average particle diameter of 6 μm as a conductive agent and PVdF as a binder were mixed in a ratio by weight of 90:8:2. Then, the mixture was dispersed in an n-methylpyrrolidone (NMP) solvent, which was then stirred using a ball mill at 1000 rpm for 2 hours to prepare a slurry. The obtained slurry was applied to an aluminum alloy foil (purity: 99.3% by weight) 15 μm in thickness, followed by drying and pressing under heating to obtain a negative electrode which was provided with a negative electrode layer 59 μm in thickness on each surface thereof and had an electrode density of 2.2 g/cm$^3$. The porosity of the negative electrode excluding the current collector was 35%. Also, the BET specific surface area of the negative electrode layer, which is a surface area per 1 g of the negative electrode layer, was 15 m$^2$/g.

A method of measuring particle diameter of the negative electrode active material is shown in the following.

In the method of measuring particle diameter of the negative electrode active material, using a laser diffraction type distribution measuring device (trade name: SALD-300, manufactured by Shimadzu Corporation), first about 0.1 g of a sample, a surfactant and 1 to 2 mL of distilled water were added in a beaker and the mixture was thoroughly stirred. Then, the resulting mixture was poured into a stirring water tank to measure the distribution of luminosity 64 times at intervals of 2 seconds, and then, the obtained data of grain distribution was analyzed, to thereby measure particle diameter of the negative electrode active material.

The BET specific surface areas of the negative electrode active material and negative electrode were measured by the $N_2$ adsorption method under the following conditions.

1 g of a powder of the negative electrode active material was weighed or two negative electrodes of 2×2 $cm^2$ were cut off as samples. As the BET specific surface area measuring device, a device manufactured by YUASA IONICS Inc. was used and nitrogen gas was used as the adsorption gas.

The porosity of the negative electrode was calculated in the following manner. The volume of the negative electrode layer was compared with that of the negative electrode layer when the porosity of the negative electrode was 0% and an increase in the volume of the negative electrode layer from that obtained when the porosity was 0% was regarded as the volume of pores to calculate the porosity of the negative electrode. In this case, the volume of the negative electrode layer is defined as the sum of the volumes of the negative electrode layers on both surfaces when the negative electrode layer is formed on each surface of the current collector.

On the other hand, the surface of the positive electrode was covered with a separator made of a polyethylene porous film having a thickness of 20 μm and a porosity of 65%, and a negative electrode was overlapped on the separator. The overlapped materials were coiled spirally to manufacture an electrode group. The ratio (Sp/Sn) of the area of the positive electrode layer to the area of the negative electrode layer was designed to be 0.98. Also, the area of the negative electrode layer was larger than the area of the positive electrode layer. The shorter width of the positive electrode layer was 50 mm, the shorter width of the negative electrode layer was 51 mm and the ratio (Lp/Ln) of these lengths was 0.98.

Moreover, this electrode group was molded into a flat form by pressing. The electrode group was put in a container made of a thin metal can of a 0.25-mm-thick aluminum alloy (Al purity: 99% by weight).

On the other hand, 1.2 mol/L of lithium tetrafluoroborate ($LiBF_4$) was dissolved as a lithium salt in an organic solvent prepared by blending ethylene carbonate (EC) with diethyl carbonate (DEC) in a ratio by volume of 1:2 to thereby prepare a liquid organic electrolyte (nonaqueous electrolytic solution). This liquid organic electrolyte was poured into the electrode group in the container to manufacture a thin secondary battery having the structure shown in FIG. 1 and a thickness of 13 mm, a width of 62 mm and a height of 95 mm.

Examples 2 to 4

Thin secondary batteries were manufactured in the same manner as in Example 1 except that the composition of the lithium/manganese-containing oxide as the first positive electrode active material was changed to that shown in the following Table 1.

Example 5

A thin secondary battery was manufactured in the same manner as in Example 1 except that the composition of the lithium/manganese-containing oxide as the first positive electrode active material was changed to that shown in the following Table 1 and the composition of the lithium-iron phosphate particles which had an olivine structure and to which carbon microparticles were stuck was changed to that shown in the following Table 1.

Examples 6 and 7

Thin secondary batteries were manufactured in the same manner as in Example 1 except that the addition ratio of the second positive electrode active material was changed to that shown in the following Table 1 when the amount of the first positive electrode active material was set to 100% by weight.

Example 8

A thin secondary battery was manufactured in the same manner as in Example 1 except that $Li_4Ti_5O_{12}$ was used as the negative electrode active material. $Li_4Ti_5O_{12}$ had an average primary particle diameter of 0.6 μm, a BET specific surface area of 9 $m^2$/g and a spinel structure.

Example 9

A thin secondary battery was manufactured in the same manner as in Example 8 except that the composition of the lithium/iron phosphate particles having an olivine structure was changed to that shown in the following Table 1.

Example 10

A thin secondary battery was manufactured in the same manner as in Example 8 except that the composition of the lithium/iron phosphate particles having an olivine structure was changed to that shown in the following Table 1 and the addition ratio of the second positive electrode active material was changed to that shown in the following Table 1 when the amount of the first positive electrode active material was set to 100% by weight.

Examples 11 and 12

Thin secondary batteries were manufactured in the same manner as in Example 1 except that the composition of the lithium/manganese-containing oxide as the first positive electrode active material was changed to that shown in the following Table 1.

Example 13

A thin secondary battery was manufactured in the same manner as in Example 1 except that $Li_2Ti_3O_7$ was used as the negative electrode active material. $Li_2Ti_3O_7$ had an average primary particle diameter of 0.5 μm, a BET specific surface area of 12 $m^2$/g and a rhamsdelite structure.

Example 14

A thin secondary battery was manufactured in the same manner as in Example 1 except that anatase type $TiO_2$ was used as the negative electrode active material. The anatase type $TiO_2$ had an average primary particle diameter of 0.5 μm and a BET specific surface area of 12 m²/g Comparative Example 1

A thin secondary battery was manufactured in the same manner as in Example 8 except that the second positive electrode active material was not used.

Comparative Example 2

A thin secondary battery was manufactured in the same manner as in Comparative Example 1 except that the composition of the first positive electrode active material was changed to that shown in Table 2.

Comparative Examples 3 and 4

Thin secondary batteries were manufactured in the same manner as in Comparative Example 1 except that as the first positive electrode active material and negative electrode active material, those shown in Table 2 were used.

Comparative Example 5

A thin secondary battery was manufactured in the same manner as in Comparative Example 1 except that the composition of the first positive electrode active material was changed to that shown in Table 2.

Comparative Example 6

A thin secondary battery was manufactured in the same manner as in Example 8 except that the first positive electrode active material was not used.

The secondary batteries obtained in Examples 1 to 14 and Comparative Examples 1, 2, 5 and 6 were respectively made to charge at 25° C. under a constant current of 20 A to 2.8 V for 30 minutes and then, to discharge under a current of 3 A to 1.2 V to measure discharge capacity. On the other hand, the secondary batteries obtained in Comparative Examples 3 and 4 were respectively made to charge at 25° C. to 4.2 V for 30 minutes and then, made to discharge under a current of 3 A to 3 V to measure discharge capacity.

Also, each secondary battery was subjected to a high-temperature storage test to measure the residual capacity and recovery capacity of the battery stored at 60° C. for one month after it was fully charged at 25° C.

The residual capacity was measured in the following method.

Each secondary battery of Examples 1 to 14 and Comparative Examples 1, 2, 5 and 6 after stored was made to discharge under a current of 3 A to 1.2 V to measure discharge capacity as the residual capacity. On the other hand, each secondary battery of Comparative Examples 3 and 4 was made to discharge under a current of 3 A to 3 V to measure discharge capacity as the residual capacity.

The recovery capacity was measured in the following manner.

After the residual capacity was measured, each secondary battery of Examples 1 to 14 and Comparative Examples 1, 2, 5 and 6 was made to charge at 25° C. under a constant current of 20 A to 2.8 V for 30 minutes and then, to discharge under a current of 3 A to 1.2 V to measure discharge capacity as the recovery capacity. After the residual capacity was measured, the secondary batteries obtained in Comparative Examples 3 and 4, on the other hand, were respectively made to charge at 25° C. to 4.2 V for 30 minutes and then, made to discharge under a current of 3 A to 3 V to measure discharge capacity as the recovery capacity.

The ratio of residual capacity (%) and the ratio of recovery capacity (%) were calculated based on the discharge capacity obtained before the battery was stored.

The high-temperature cycle life of the battery was evaluated at 60° C. as follows. Specifically, a cycle of a charging rate from 100% to 0% was repeated to determine the number of cycles when the capacity was 80%.

The results of measurement are shown in the following Tables 3 and 4.

TABLE 1

| | First positive electrode active material | Second positive electrode active material | Ratio of second positive electrode active material to be added (% by weight) | Negative electrode active material | Nonaqueous electrolyte composition |
|---|---|---|---|---|---|
| Example 1 | $LiMn_{0.2}Ni_{0.8}O_2$ | $LiFePO_4$ | 12.5 | $TiO_2(B)$ | $LiBF_4$— EC/DEC(1:2) |
| Example 2 | $Li_{1.2}Mn_{0.6}Ni_{0.2}O_2$ | $LiFePO_4$ | 12.5 | $TiO_2(B)$ | $LiBF_4$— EC/DEC(1:2) |
| Example 3 | $LiMn_{0.1}Co_{0.1}Ni_{0.8}O_2$ | $LiFePO_4$ | 12.5 | $TiO_2(B)$ | $LiBF_4$— EC/DEC(1:2) |
| Example 4 | $LiMn_{0.1}Al_{0.05}Ni_{0.85}O_2$ | $LiFePO_4$ | 12.5 | $TiO_2(B)$ | $LiBF_4$— EC/DEC(1:2) |
| Example 5 | $Li_{1.1}Mn_{0.9}O_2$ | $LiMn_{0.5}Fe_{0.5}PO_4$ | 12.5 | $TiO_2(B)$ | $LiBF_4$— EC/DEC(1:2) |
| Example 6 | $LiMn_{0.2}Ni_{0.8}O_2$ | $LiFePO_4$ | 1 | $TiO_2(B)$ | $LiBF_4$— EC/DEC(1:2) |
| Example 7 | $LiMn_{0.2}Ni_{0.8}O_2$ | $LiFePO_4$ | 60 | $TiO_2(B)$ | $LiBF_4$— EC/DEC(1:2) |
| Example 8 | $LiMn_{0.2}Ni_{0.8}O_2$ | $LiFePO_4$ | 12.5 | Spinel type $Li_4Ti_5O_{12}$ | $LiBF_4$— EC/DEC(1:2) |
| Example 9 | $LiMn_{0.2}Ni_{0.8}O_2$ | $LiMn_{0.5}Fe_{0.5}PO_4$ | 12.5 | Spinel type $Li_4Ti_5O_{12}$ | $LiBF_4$— EC/DEC(1:2) |
| Example 10 | $LiMn_{0.2}Ni_{0.8}O_2$ | $LiMn_{0.8}Fe_{0.2}PO4$ | 80 | Spinel type $Li_4Ti_5O_{12}$ | $LiBF_4$— EC/DEC(1:2) |
| Example 11 | $Li_2MnF_{0.05}O_{2.95}$ | $LiFePO_4$ | 12.5 | $TiO_2(B)$ | $LiBF_4$— EC/DEC(1:2) |
| Example 12 | $Li_2MnO_3$ | $LiFePO_4$ | 12.5 | $TiO_2(B)$ | $LiBF_4$— EC/DEC(1:2) |
| Example 13 | $LiMn_{0.2}Ni_{0.8}O_2$ | $LiFePO_4$ | 12.5 | Rhamsdelite type $Li_2Ti_3O_7$ | $LiBF_4$— EC/DEC(1:2) |
| Example 14 | $LiMn_{0.2}Ni_{0.8}O_2$ | $LiFePO_4$ | 12.5 | Anatase type $TiO_2$ | $LiBF_4$— EC/DEC(1:2) |

TABLE 2

|  | First positive electrode active material | Second positive electrode active material | Ratio of second positive electrode active material to be added (% by weight) | Negative electrode active material | Nonaqueous electrolyte composition |
|---|---|---|---|---|---|
| Comparative Example 1 | $LiMn_{0.2}Ni_{0.8}O_2$ | — | 0 | Spinel type $Li_4Ti_5O_{12}$ | $LiBF_4$— EC/DEC(1:2) |
| Comparative Example 2 | $LiNiO_2$ | — | 0 | Spinel type $Li_4Ti_5O_{12}$ | $LiBF_4$— EC/DEC(1:2) |
| Comparative Example 3 | $LiMn_2O_4$ | — | 0 | Graphite | $LiBF_4$— EC/DEC(1:2) |
| Comparative Example 4 | $LiMn_{0.2}Ni_{0.8}O_2$ | — | 0 | Hard carbon | $LiBF_4$— EC/DEC(1:2) |
| Comparative Example 5 | $LiCoO_2$ | — | 0 | Spinel type $Li_4Ti_5O_{12}$ | $LiBF_4$— EC/DEC(1:2) |
| Comparative Example 6 | — | $LiFePO_4$ | 100 | Spinel type $Li_4Ti_5O_{12}$ | $LiBF_4$— EC/DEC(1:2) |

TABLE 3

|  | Discharge capacity at 25° C. (Ah) | Ratio of residual capacity after stored at 60° C. for one month (%) | Ratio of recovery capacity after stored at 60° C. for one month (%) | Cycle life at 60° C. |
|---|---|---|---|---|
| Example 1 | 7.7 | 85 | 90 | 3000 |
| Example 2 | 9.0 | 85 | 90 | 2500 |
| Example 3 | 7.0 | 80 | 85 | 3200 |
| Example 4 | 7.2 | 85 | 90 | 3200 |
| Example 5 | 9.2 | 88 | 92 | 2800 |
| Example 6 | 7.9 | 80 | 88 | 2800 |
| Example 7 | 6.4 | 90 | 92 | 3800 |
| Example 8 | 6.6 | 88 | 90 | 4000 |
| Example 9 | 6.8 | 85 | 90 | 3800 |
| Example 10 | 7.2 | 85 | 90 | 3500 |
| Example 11 | 7.5 | 90 | 93 | 3500 |
| Example 12 | 8.5 | 85 | 88 | 2800 |
| Example 13 | 7.7 | 83 | 87 | 2500 |
| Example 14 | 7.9 | 85 | 88 | 2000 |

TABLE 4

|  | Discharge capacity at 25° C. (Ah) | Ratio of residual capacity after stored at 60° C. for one month (%) | Ratio of recovery capacity after stored at 60° C. for one month (%) | Cycle life at 60° C. |
|---|---|---|---|---|
| Comparative Example 1 | 6.0 | 30 | 70 | 2000 |
| Comparative Example 2 | 6.2 | 30 | 70 | 1500 |
| Comparative Example 3 | 6.2 | 30 | 30 | 500 |
| Comparative Example 4 | 6.0 | 50 | 60 | 1000 |
| Comparative Example 5 | 7.0 | 50 | 75 | 2000 |
| Comparative Example 6 | 5.0 | 70 | 90 | 3000 |

As is clear from Tables 1 to 4, the secondary batteries of Examples 1 to 14 have a higher capacity and better residual capacity after stored at 60° C., recovery capacity after stored at 60° C. and high-temperature cycle life than the secondary batteries of Comparative Examples 1 to 6. With regard to the high-temperature cycle life performance, the secondary battery of Example 1 is compared with the secondary battery of Example 8. It is found from this comparison that the battery of Example 8 using $Li_4Ti_5O_{12}$ having a spinel structure as the negative electrode active material is superior to the battery of Example 1. Also, with regard to the capacity, it is found from comparison between Examples 1, 8, 13 and 14 that a high capacity is obtained in the case of the secondary battery of Example 14 using anatase type $TiO_2$ as the negative electrode active material.

On the contrary, the battery of Comparative Example 1 using no second positive electrode active material, the battery of Comparative Example 6 using no first positive electrode active material and the batteries of Comparative Examples 2, 3 and 5 using $LiNiO_2$, $LiCoO_2$ or a spinel type lithium/manganese oxide ($LiMn_2O_4$) as the positive electrode active material were inferior in any of the capacity, residual capacity, recovery capacity and high-temperature cycle life performance to the batteries of Examples. Also, like the case of the batteries of Comparative Examples 3 and 4, when a carbonaceous material was used for the negative electrode active material, the solvent was decomposed to generate gas, so that the high-temperature cycle life performance was significantly deteriorated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
a positive electrode comprising a mixture of particles of a lithium manganese-containing oxide represented by $Li_aMn_bM_cO_z$ (M is at least one selected from the group consisting of Ni, Co, and F, and a, b, c and Z satisfy the following formulas: $0<a\leq2.5$, $0<b\leq1$, $0<c\leq1$ and $2\leq Z\leq3$) and particles of a Fe-containing phosphorous compound having an olivine structure and represented by $Li_dMn_xFe_{1-x}PO_4$, and d and x satisfy the following equations: $0\leq d\leq2.5$, $0.5\leq x<1$;
a negative electrode comprising a titanium-containing metal oxide into which lithium ions are inserted and from which lithium ions are extracted; and
a nonaqueous electrolyte,
wherein a protective film comprising Fe is provided on a surface of the negative electrode, and
a weight of the particles of the Fe-containing phosphorous compound is 1% by weight or more and 80% by weight or less, based on 100% by weight of the particles of the lithium manganese-containing oxide.

2. The nonaqueous electrolyte battery according to claim 1, wherein the weight of the particles of the Fe-containing phosphorous compound is 2% by weight or more and 60% by weight or less, based on 100% by weight of the particles of the lithium manganese-containing oxide.

3. The nonaqueous electrolyte battery according to claim 1, wherein a weight of the particles of the Fe-containing phosphorous compound is 60% by weight or more and 80% by weight or less, based on 100% by weight of the particles of the lithium manganese-containing oxide.

4. The nonaqueous electrolyte battery according to claim 1, wherein the titanium-containing metal oxide is at least one selected from the group consisting of monoclinic system titanium dioxide, $Li_{4+x}Ti_5O_{12}$ and $Li_{2+x}Ti_3O_7$, and x may be varied in the following range: $-1\leq x\leq3$, depending on a charge/discharge reaction.

5. The nonaqueous electrolyte battery according to claim 1, wherein
the titanium-containing metal oxide is at least one selected from the group consisting of a lithium titanium oxide having a spinel structure, a lithium titanium oxide having a rhamsdelite structure and a titanium dioxide, and the nonaqueous electrolyte comprises a first solvent containing at least one selected from the group consisting of propylene carbonate, ethylene carbonate and γ-butyrolactone and a second solvent containing at least one selected from the group consisting of diethyl carbonate, methyl ethyl carbonate and dimethyl carbonate.

6. The nonaqueous electrolyte battery according to claim 1, wherein
the titanium-containing metal oxide is at least one selected from the group consisting of a lithium titanium oxide having a spinel structure, a lithium titanium oxide having a rhamsdelite structure and a titanium dioxide, and
the nonaqueous electrolyte comprises a nonaqueous solvent containing ethylene carbonate and diethyl carbonate, and lithium tetrafluoroborate dissolved in the nonaqueous solvent.

7. The nonaqueous electrolyte battery according to claim 1, wherein the titanium-containing metal oxide further contains lithium.

8. The nonaqueous electrolyte battery according to claim 1, wherein the titanium-containing metal oxide is at least one selected from the group consisting of a lithium titanium oxide having a spinel structure, a lithium titanium oxide having a rhamsdelite structure and a titanium dioxide.

9. The nonaqueous electrolyte battery according to claim 8, wherein the titanium dioxide is titanium dioxide having an anatase structure and/or monoclinic system titanium dioxide.

10. The nonaqueous electrolyte battery according to claim 1, wherein the nonaqueous electrolyte comprises a first solvent containing at least one selected from the group consisting of propylene carbonate, ethylene carbonate and γ-butyrolactone and a second solvent containing at least one selected from the group consisting of diethyl carbonate, methyl ethyl carbonate and dimethyl carbonate.

11. The nonaqueous electrolyte battery according to claim 1, wherein the positive electrode comprises a carbon material provided on a surface of the particles of the Fe-containing phosphorous compound.

12. The nonaqueous electrolyte battery according to claim 11, wherein the carbon material includes carbonaceous materials in which a layer spacing $d_{002}$ of a (002) plane detected by X-ray diffraction is 0.37 nm or less.

13. The nonaqueous electrolyte battery according to claim 1, wherein the positive electrode comprises a positive electrode layer comprising the mixture, and a specific surface area of the positive electrode layer measured by BET method falls within a range of 0.1 to 2 $m^2/g$.

14. The nonaqueous electrolyte battery according to claim 1, wherein the negative electrode comprises a negative electrode layer comprising the titanium-containing metal oxide, and a specific surface area of the negative electrode layer measured by BET method falls within a range of 3 to 50 $m^2/g$.

15. The nonaqueous electrolyte battery according to claim 1, wherein a ratio (Sp/Sn) of an area (Sp) of the positive electrode layer to an area (Sn) of the negative electrode layer falls within a range of 0.85 to 0.999.

16. The nonaqueous electrolyte battery according to claim 1, wherein the nonaqueous electrolyte comprises a liquid organic electrolyte, a gel organic electrolyte or a solid nonaqueous electrolyte.

* * * * *